(12) United States Patent
Curl et al.

(10) Patent No.: US 10,421,638 B2
(45) Date of Patent: Sep. 24, 2019

(54) DRIVE BELT SAFETY DEVICE AND A METHOD OF USING THE SAME

(71) Applicant: Otis Elevator Company, Farmington, CT (US)

(72) Inventors: Stephen Curl, Pelton (GB); Keith Browse, Charnock Richard (GB)

(73) Assignee: OTIS ELEVATOR COMPANY, Farmington, CT (US)

(*) Notice: Subject to any disclaimer, the term of this patent is extended or adjusted under 35 U.S.C. 154(b) by 20 days.

(21) Appl. No.: 15/543,888

(22) PCT Filed: Dec. 30, 2015

(86) PCT No.: PCT/US2015/068002
§ 371 (c)(1),
(2) Date: Jul. 14, 2017

(87) PCT Pub. No.: WO2016/114927
PCT Pub. Date: Jul. 21, 2016

(65) Prior Publication Data
US 2017/0369279 A1 Dec. 28, 2017

Related U.S. Application Data

(60) Provisional application No. 62/103,634, filed on Jan. 15, 2015.

(51) Int. Cl.
*B66B 5/00* (2006.01)
*B66B 7/06* (2006.01)
*F16H 7/24* (2006.01)

(52) U.S. Cl.
CPC ............ *B66B 5/0087* (2013.01); *B66B 7/062* (2013.01); *F16H 7/24* (2013.01)

(58) Field of Classification Search
CPC .......... B66B 5/0087; B66B 7/062; F16H 7/24
(Continued)

(56) References Cited

U.S. PATENT DOCUMENTS

| 992,770 A | 5/1911 | Hemmer |
| 1,317,329 A * | 9/1919 | Shorday .................. B60R 25/09 |
| | | 188/32 |

(Continued)

FOREIGN PATENT DOCUMENTS

| FR | 1348394 | 1/1964 |
| SU | 1214564 A1 | 2/1986 |

(Continued)

OTHER PUBLICATIONS

European Patent Office, International Search Report, dated Apr. 5, 2016.

(Continued)

*Primary Examiner* — Michael R Mansen
*Assistant Examiner* — Mark K Buse
(74) *Attorney, Agent, or Firm* — Cantor Colburn LLP

(57) ABSTRACT

The invention discloses: —a drive belt safety device (20) including a belt retaining portion (22) and a wedging portion (24) operably coupled to the belt retaining portion (22), wherein the wedging portion (24) includes a geometry configured to wedge between a drive belt (16) and a pulley (12, 14); and —a method of securing a drive belt system (10), the drive belt system (10) comprising a pair of pulleys (12, 14) configured to rotate and a drive belt (16) disposed around each of the pulleys (12, 14), the method comprising the steps of placing at least one drive belt safety device (20) adjacent to a pulley (12, 14), and securing a portion of the drive belt (16) to the at least one drive belt safety device (20).

12 Claims, 5 Drawing Sheets

(58) Field of Classification Search
USPC .......................................... 474/122, 144, 130
See application file for complete search history.

(56) References Cited

U.S. PATENT DOCUMENTS

| | | | | | |
|---|---|---|---|---|---|
| 1,912,038 | A | * | 5/1933 | Irish | ............ B60T 3/00 188/32 |
| 3,138,963 | A | * | 6/1964 | Prince | ........ F16H 7/24 254/104 |
| 3,664,466 | A | * | 5/1972 | Rotheiser | ............ B60T 3/00 188/32 |
| 3,695,394 | A | | 10/1972 | Carpenter | |
| 3,810,530 | A | * | 5/1974 | Jay | ............ B60T 3/00 188/32 |
| 4,506,781 | A | | 3/1985 | Briggs | |
| 4,752,989 | A | | 6/1988 | Jaubert | |
| 4,917,219 | A | * | 4/1990 | Henry | ............ B60T 3/00 188/32 |
| 5,392,880 | A | | 2/1995 | Christian | |
| 6,089,606 | A | | 7/2000 | Smithson | |
| 6,290,294 | B1 | * | 9/2001 | Volz | ............ A47C 3/03 297/270.1 |
| 6,425,465 | B1 | | 7/2002 | Tallman et al. | |
| 6,565,467 | B2 | | 5/2003 | Amkreutz | |
| 6,793,041 | B1 | * | 9/2004 | Taylor | ............ E06C 7/44 182/121 |
| 8,241,159 | B2 | | 8/2012 | Iwata | |
| 8,684,871 | B2 | | 4/2014 | Mitchell | |
| 8,753,238 | B2 | * | 6/2014 | Kunisada | ............ F16H 7/24 474/130 |
| 2004/0002400 | A1 | | 1/2004 | Ellis et al. | |
| 2011/0240416 | A1 | * | 10/2011 | Brooks | ............ B60T 3/00 188/32 |
| 2014/0018200 | A1 | * | 1/2014 | Kunisada | ............ F16H 7/24 474/130 |
| 2014/0141911 | A1 | | 5/2014 | Kurtz | |

FOREIGN PATENT DOCUMENTS

| | | |
|---|---|---|
| WO | 0163145 A1 | 9/2001 |
| WO | 0236987 A1 | 5/2002 |

OTHER PUBLICATIONS

European Patent Office, Written Opinion of the International Searching Authority, dated Apr. 5, 2016.

* cited by examiner

DRIVE BELT SAFETY DEVICE AND A METHOD OF USING THE SAME

CROSS-REFERENCE TO RELATED APPLICATIONS

The present application is a U.S. national stage of, and claims the priority benefit of, International Patent Application Serial No. PCT/US2015/068002, filed Dec. 30, 2015 and also claims the priority benefit of U.S. Application Ser. No. 62/103,634 filed Jan. 15, 2015, the text and drawings of which are hereby incorporated by reference in their entireties.

TECHNICAL FIELD OF THE DISCLOSED EMBODIMENTS

The presently disclosed embodiments generally relate to pulley to pulley drive systems and more particularly, to a drive belt safety device and a method of using the same.

BACKGROUND OF THE DISCLOSED EMBODIMENTS

Generally, pulley to pulley drive systems, as those used in elevators, automobiles, heating, cooling, and ventilation systems, refrigeration systems, etc., are used when there is a need to transmit rotary motion. Generally, these systems consist of two pulleys and a belt. When a motor is turned on it revolves a small pulley known as a driver pulley. The belt causes a larger pulley, known as a driven pulley, wheel to rotate as well. During maintenance of such systems, the pulleys are capable of rotating; thus, creating a hazard for service personnel working in and around the system. There is therefore a need for a safety device configured to prevent the pulleys from rotating during maintenance.

SUMMARY OF THE DISCLOSED EMBODIMENTS

In one aspect a drive belt safety device is provided. The drive belt safety device includes a belt retaining portion and a wedging portion operably coupled to the belt retaining portion.

The belt retaining portion includes a front surface, a rear surface, a top surface, a bottom surface, including a bottom surface axis, and a pair of opposing side surfaces. In one embodiment, each opposing side wall includes at least one aperture disposed therein. In one embodiment, a channel is disposed within the top surface. In one embodiment, the channel extends from the front surface to the rear surface. In one embodiment, the top surface includes at least one indentation disposed therein.

The wedging portion is operably coupled to the front surface of the belt retaining portion. In one embodiment, the wedging portion includes a geometry, wherein the geometry is configured to wedge between a drive belt and a pulley. In one embodiment, the geometry includes a triangular prism including a wedging portion bottom surface, and wedging angle formed between the bottom surface axis and the wedging portion bottom surface. In one embodiment, the wedging angle is less than or equal to approximately 45 degrees.

In one aspect, a method of securing a drive belt system using the drive belt safety device is provided. The method including the step of placing at least one drive belt safety device adjacent to a pulley. In one embodiment, the step of placing at least one drive belt safety device adjacent to a pulley includes placing a first drive belt safety device adjacent to one of the pulleys and placing a second drive belt safety device adjacent to one of the pulleys. In one embodiment, placing a first drive belt safety device adjacent to one of the pulleys and placing a second drive belt safety device adjacent to one of the pulleys includes placing the wedging portion in contact with the pulley to prevent the pulley from rotating in a clockwise direction and a counter-clockwise direction.

The method further includes the step of securing a portion of a drive belt to the at least one drive belt safety device. In one embodiment, the step of securing the drive belt to the at least one drive belt safety device includes securing the drive belt to the belt securing portion. In one embodiment, securing the drive belt to the belt securing portion includes placing the drive belt within the channel, inserting a securing device through the at least one apertures, wrapping the securing device around the drive belt, and tightening the securing device.

In one embodiment, the method further includes the step of placing a lock on the at least one drive belt safety device. In one embodiment, the step of placing a lock on the at least one drive belt safety device includes inserting a lock into the at least one aperture.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
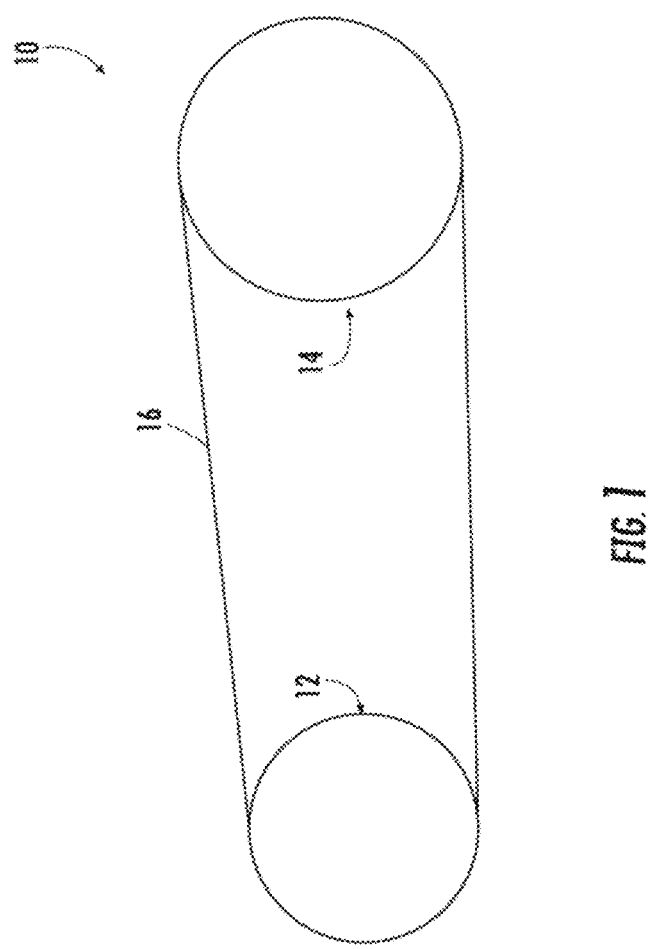
FIG. 1 illustrates a schematic diagram of an drive belt system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a drive belt system, generally indicated at 10, used in the operation of an elevator system, automobiles, heating, cooling, and ventilation systems, and refrigeration systems to name a few non-limiting examples. The drive belt system 10 includes a pair of pulleys 12, 14, and a drive belt 16 disposed around each of the pair of pulleys 12, 14.

Figure 2:
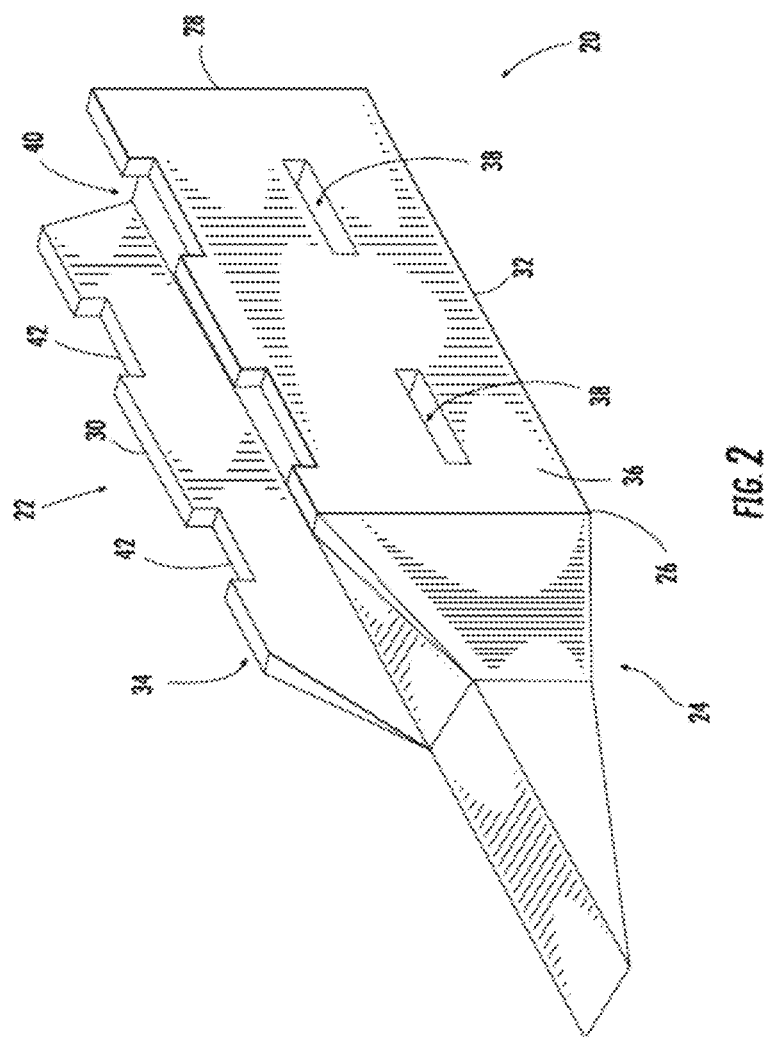
FIG. 2 illustrates a perspective view of a drive belt safety device according to an embodiment of the present disclosure.

FIG. 2 illustrates a drive belt safety device, generally indicated at 20. The drive belt safety device 20 includes a belt retaining portion 22 and a wedging portion 24 operably coupled to the belt retaining portion 22. It will be appreciated that the belt retaining portion 22 and the wedging portion 24 may be formed from one continuous piece of material. It will also be appreciated that the drive belt safety device may be composed of any durable material, such as, wood, aluminum, or polypropylene to name a few non limiting examples.

The belt retaining portion 22 includes a front surface 26, a rear surface 28. A top surface 30, a bottom surface 32, including a bottom surface axis 33, and a pair of opposing side surfaces 34, 36. In one embodiment, each opposing side wall 34, 36 includes at least one aperture 38 disposed therein. The at least one aperture 38 is configured to receive a securing device (not shown) and/or a lock. In one embodiment, a channel 40 is disposed within the top surface 30. The channel 40 is configured to allow a portion of the belt 16 to be placed therein. In one embodiment, the channel 40 extends from the front surface 26 to the rear surface 28. In one embodiment, the top surface 30 includes at least one indentation 42 disposed therein. The at least one indentation 42 is configured to engage a portion of a securing device (not shown).

Figure 3:
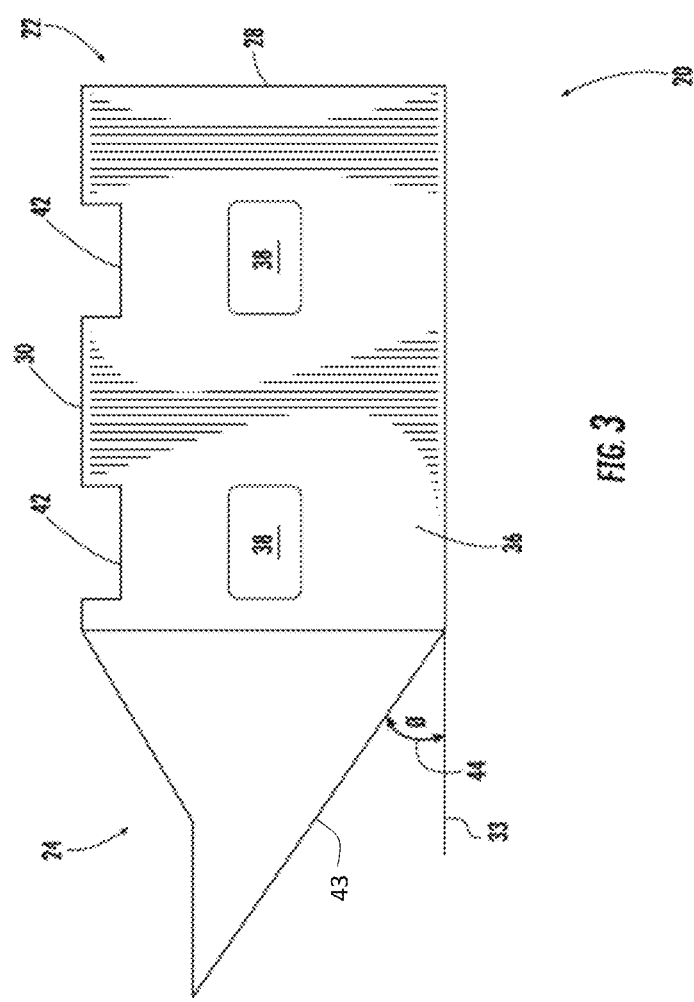
FIG. 3 illustrates a side view of a drive belt safety device according to an embodiment of the present disclosure.

As shown in FIG. 3, the wedging portion 24 is operably coupled to the front surface 26. The wedging portion 24 includes a geometry, wherein the geometry is configured to wedge between a drive belt 16 and a pulley 12, 14 (see FIG. 5). In one embodiment, the geometry includes a triangular prism including a wedging portion bottom surface 43, and wedging angle 44 formed between the bottom surface axis 33 and the wedging portion bottom surface 43. In one embodiment, the wedging angle 44 is less than or equal to approximately 45 degrees. It will be appreciated that the wedging angle 44 may be greater than approximately 45 degrees. It will also be appreciated that the geometry may include any geometry suitable for placing the wedging portion 24 between a drive belt and a pulley, for example, a cone, a half-sphere and a tetrahedron to name a couple of non-limiting examples.

Figure 4:
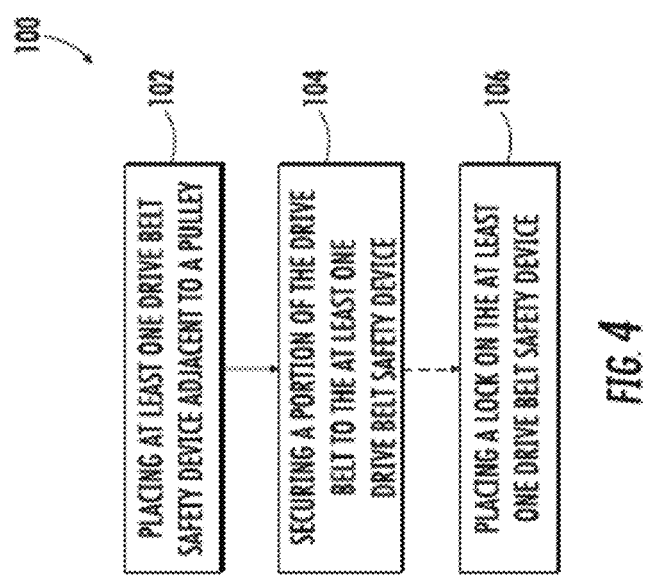
FIG. 4 illustrates a schematic flow diagram of a method of securing a drive belt system using a drive belt safety device.
Figure 5:
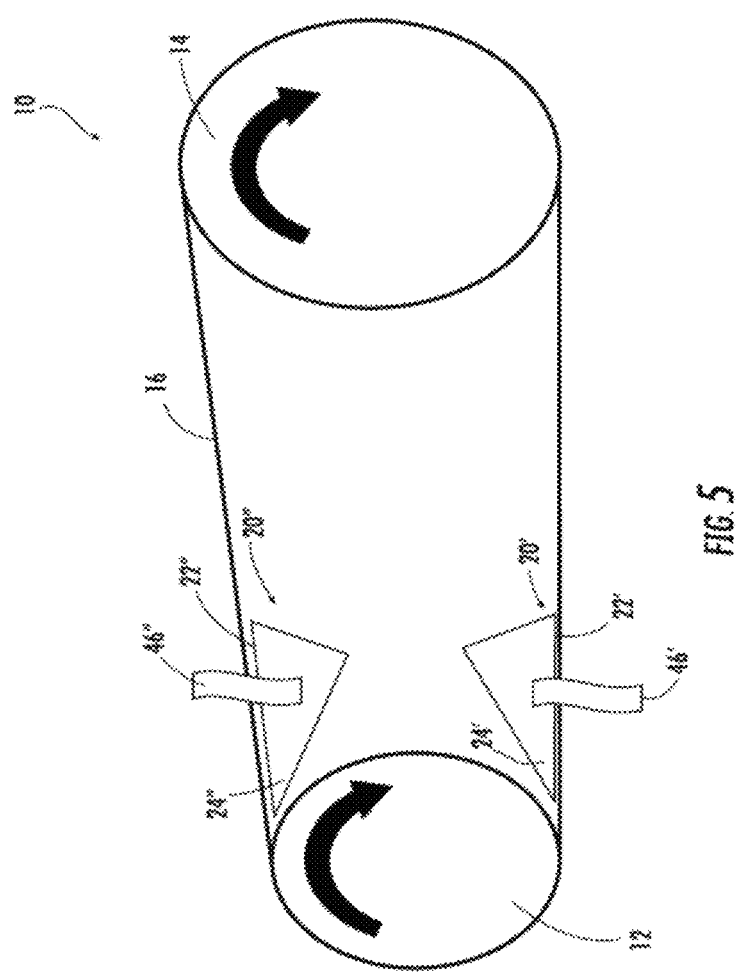
FIG. 5 illustrates a schematic drawing of a pair of drive belt safety devices in use with a drive belt system.

FIG. 4 illustrates a method, generally indicated at 100, of securing the drive belt system 10 using the drive belt safety device 20, the method including the step 102 placing at least one drive belt safety device 20 adjacent to a pulley 12, 14. In one embodiment, the step of placing at least one drive belt safety device 20 adjacent to a pulley 12, 14 includes placing a first drive belt safety device 20 adjacent to one of the pulleys 12, 14 and placing a second drive belt safety device 20 adjacent to one of the pulleys 12, 14. In one embodiment, placing a first drive belt safety device 20 adjacent to one of the pulleys 12, 14 and placing a second drive belt safety device 20 adjacent to one of the pulleys 12, 14 includes placing the wedging portion 24 in contact with the pulley 12, 14 to prevent the pulley 12, 14 from rotating in a clockwise direction and a counter-clockwise direction. For example, as shown in FIG. 5, a first drive belt safety device 20' is placed adjacent to a bottom portion of pulley 12 such that the wedging portion 24' is in contact with the bottom portion pulley 12. The first drive belt safety device 20' prevents the pulley 12 from rotating in a clockwise direction. A second drive belt safety device 20" is also placed adjacent to a top portion of pulley 12 such that the wedging portion 24" is in contact with the top portion of pulley 12. In this instance, second drive belt safety device 20" prevents the pulley 12 from rotating in a counter-clockwise direction.

The method 100 further includes the step 104 of securing a portion of the drive belt 16 to the at least one drive belt safety device 20. In one embodiment, the step of securing the drive belt 16 to the at least one drive belt safety device 20 includes securing the drive belt 16 to the belt retaining portion 22. In one embodiment, securing the drive belt 16 to the belt retaining portion 22 includes placing the drive belt 16 within the channel 40, inserting a securing device 46 (shown in FIG. 5) through the at least one apertures 38, wrapping the securing device 46 around the drive belt 16, and tightening the securing device 46. For example, as shown in FIG. 5, securing device 46' secures a portion of the drive belt 16 near the bottom portion of pulley 12, and securing device 46" secures a portion of the drive belt 16 near the top portion of pulley 12. The securing device 46 is operative to keep the at least one drive belt safety device 20 in the proper location in the event that the wedging portion 24 become disengaged with the pulley 12. It will be appreciated that the securing device 46 may be any securing device configured for the purpose of securing a portion of the drive belt 16, such as a wire tie to name one non-limiting example. It will also be appreciated that the securing device may be composed of any materials suitable for the present application, such as plastic or rubber molding to name a couple of non-limiting examples.

In one embodiment, the method 100 further includes the step 106 of placing a lock on the at least one drive belt safety device 20. In one embodiment, the step of placing a lock on the at least one drive belt safety device 20 includes inserting a lock (not shown) into the at least one aperture 38. For example, a lock (not shown) may be inserted into one of the at least one apertures. The lock is configured to be an additional safety mechanism to indicate that the drive belt system 10 is not operational. In order to place the drive belt system 10 back in operation, the individual must either have the proper key, or locate the individual who placed the lock on the drive belt safety device 20 and have that individual remove the lock if required.

It will therefore be appreciated that use of present embodiments of a drive belt safety device 20 will reduce the number of accidental pinching and amputation of limbs/digits because the drive belt safety device 20 includes a wedging portion 24 configured to prevent a pulley 12, 14 from rotating in a clockwise and counter-clockwise direction, and a belt retaining portion 22 configured to retain, secure, and lock a drive belt 16 to the drive belt safety device 20; thus, requiring authorized removal of the drive belt security device 20 prior to placing the drive belt system 10 back into operation.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A drive belt safety device comprising:
   a belt retaining portion; and
   a wedging portion operably coupled to the belt retaining portion, wherein the wedging portion includes a geometry configured to wedge between a drive belt and a pulley;
   wherein the belt retaining portion comprises a front surface, a rear surface, a top surface, a bottom surface including a bottom surface axis, a pair of opposing side surfaces, and at least one aperture disposed within each of the opposing side surfaces; and
   wherein the wedging portion is operably coupled to the front surface.

2. The drive belt safety device of claim 1, wherein the geometry comprises a triangular prism including a wedging portion bottom surface, and a wedging angle, wherein the wedging angle is formed between the bottom surface axis and the wedging portion bottom surface.

3. The drive belt safety device of claim 2, wherein the wedging angle is equal to approximately 45 degrees.

4. The drive belt safety device of claim 1, further comprising a channel disposed within the top surface.

5. The drive belt safety device of claim 4, wherein the channel extends from the front surface to the rear surface.

6. The drive belt safety device of claim 1, further comprising at least one indentation disposed on the top surface.

7. A method of securing a drive belt system, the drive belt system comprising a pair of pulleys configured to rotate and a drive belt disposed around each of the pulleys, the method comprising:
   placing at least one drive belt safety device adjacent to a pulley;
   placing a lock on the at least one drive belt safety device, wherein placing the lock on the at least one drive belt safety device comprises inserting the lock through at least one aperture in the at least one drive belt safety device.

8. The method of claim 7, wherein the at least one drive belt safety device comprises:
   a belt retaining portion including a front surface, a rear surface, top surface, a bottom surface, and a pair of opposing side surfaces;
   a wedging portion operably coupled to the front surface, wherein the wedging portion includes a wedging portion top surface and a wedging portion bottom surface;
   at least one aperture disposed within each of the opposing side surfaces;
   a channel disposed within the top surface, wherein the channel extends from the front surface to the rear surface.

9. The method of claim 8, wherein the at least one drive belt safety device further comprises at least one indentation disposed on the top surface.

10. A method of securing a drive belt system, the drive belt system comprising a pair of pulleys configured to rotate and a drive belt disposed around each of the pulleys, the method comprising:
    placing at least one drive belt safety device adjacent to a pulley; and
    securing a portion of the drive belt to the at least one drive belt safety device;
    wherein placing the at least one drive belt safety device adjacent to the pulley comprises:
    placing a first drive belt safety device adjacent to one of the pulleys to prevent the pulley from rotating in a clockwise direction; and
    placing a second drive belt safety device adjacent to one of the pulleys to prevent the pulley from rotating in a counter-clockwise direction.

11. The method of claim 10, wherein placing the first drive belt safety device adjacent one of the pulleys to prevent the pulley from rotating in the clockwise direction comprises placing a wedging portion of the first drive belt safety device in contact with the pulley.

12. The method of claim 10, wherein placing the second drive belt safety device adjacent to one of the pulleys to prevent the pulley from rotating in the counter-clockwise direction comprises placing a wedging portion of the second drive belt safety device in contact with the pulley.

* * * * *